3,448,197
BENZAMIDOALKYLTHIOPSEUDOUREAS AS
ANESTHETIC AGENTS
Bernard M. Regan, Chicago, Ill., assignor to Baxter
Laboratories, Inc., Morton Grove, Ill., a corporation of Delaware
No Drawing. Continuation-in-part of application Ser. No. 663,950, Aug. 29, 1967, which is a division of application Ser. No. 372,673, June 4, 1964. This application May 8, 1968, Ser. No. 727,683
Int. Cl. A61k 27/00
U.S. Cl. 424—324      14 Claims

ABSTRACT OF THE DISCLOSURE

A method of inducing local anesthesia by administering to animals a benzamidoalkylthiopseudourea of the class shown in the second paragraph of the specification, for example, 2-(2'-benzamidoethylthio) - 1 - cyclohexylpseudourea.

---

This is a continuation-in-part of co-pending application Ser. No. 663,950, filed Aug. 29, 1967, now abandoned. Application Ser. No. 663,950 is a division of application Ser. No. 372,673, filed June 4, 1964, now abandoned.

The present invention relates to novel thiopsuedoureas and in particular to the novel benzamidoalkylthiopseudoureas having the general formula

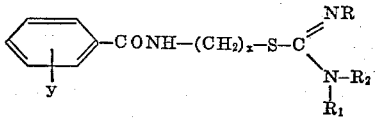

wherein $y$ is selected from the group consisting of —H, —Cl and —Br; $x$ is an integer of from 2 to 3; R, $R_1$ and $R_2$ are each selected from the group consisting of —H, —CH$_2$CH=CH$_2$, lower alkyl having from 1 to 4 carbon atoms and cyclohexyl and at least one of R, $R_1$ and $R_2$ are other than hydrogen; and the pharmaceutically acceptable acid salts thereof.

The novel benzamidoalkylthiopseudoureas of the present invention can be conveniently prepared by reacting a benzamidoalkyl halide with an appropriate thiourea to form the hydrohalic acid salt. For example, benzamidoethyl chloride can be reacted with an alkyl thiourea to form a benzamidoethylthiopseudourea hydrogen chloride salt. The free base form of the benzamidoalkylthiopseudourea can then be prepared by reacting the salt with an alkaline reagent, for example, sodium carbonate, sodium hydroxide, aqueous ammonia, and other such alkaline reagents commonly employed for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, citric, tartaric, lactic, malic, fumaric, succinic, ascorbic, pyruvic and the like inorganic and organic acids known to be pharmaceutically acceptable.

In a preferred method of the present invention, a mixture of a benzamidoalkyl chloride or bromide (0.1 mole), an appropriate thiourea (0.1 mole) and ethanol (100 ml.) is heated to boiling (ca. 80° C.) and refluxed for about 5 to about 16 hours. The excess solvent is removed by distillation, the residue is diluted with ethyl acetate or acetone and the resulting mixture is cooled to precipitate the salts of the benzamidoalkylthiopseudoureas as substantially pure reaction products. If it is desired, the compounds can be recrystallized from acetone or from mixtures of ethyl acetate and methanol or ethanol for further purification.

Examples of benzamidoalkylhalides which can be used for the preparation of the novel thiopseudoureas of the present invention are compounds having the general formula

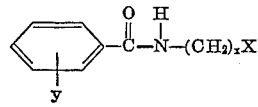

wherein $y$ is selected from the group consisting of —H, —Cl and —Br, X is selected from the group consisting of —Cl and —Br, and $x$ is an integer of from 2 to 3.

Examples of thioureas which can be used for the preparation of the novel thiopseudoureas of the present invention are compounds having the general formula

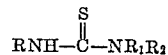

wherein R, $R_1$ and $R_2$ are each selected from the group consisting of —H, —CH$_2$CH=CH$_2$, lower alkyl having from 1 to 4 carbon atoms and cyclohexyl and at least one of R, $R_1$ and $R_2$ are other than hydrogen.

Preferred compounds of the present invention are those in which the benzamidoalkyl moiety is selected from the group consisting of:

benzamidoethyl,
benzamidopropyl, and
o-chlorobenzamidoethyl.

Also preferred are those compounds in which the pseudourea moiety is selected from the groups consisting of 1,3-diisopropylpseudourea,
1-cyclohexylpseudourea,
1-cyclohexyl-3-methylpseudourea,
1-n-butylpseudourea,
1,1-diethylpseudourea, and
1,1-diallylpseudourea.

Although preferred benzamidoalkylthiopseudoureas and specific methods of preparation are described herein, it will be understood that the invention is not limited to these preferred compounds or these specific methods of preparation.

The novel benzamidoalkylthiopseudoureas of the present invention are effective and useful agents for inducing local anesthesia in animals. They are generally more active topically on guinea pig cornae and intradermally in guinea pig wheals and generally have better margins of safety than the current drug of choice, lidocaine hydrochloride, as determined in direct, side-by-side comparisons with that drug.

The novel benzamidoalkylthiopseudoureas of the present invention can be used as local anesthetic agents in the free base form or in the form of pharmaceutically acceptable acid salts of the free bases. For convenience in administration in aqueous solution, it is preferable to use the salt form of the compounds. The free base from is preferable when it is desired to use the compounds in oleaginous pharmaceutical diluents. The novel compounds of the present invention can be conveniently administered in the form of ointments, salves, aerosol sprays, solutions and the like. The effective amount of anesthetic agent to be administered will, of course, depend upon many factors such as, for example, the size of the local area to be anesthetized, the length of time anesthesia is desired, the nature of the treatment requiring local anesthesia, the physical condition of the subject undergoing treatment and other such factors. It will be understood that the method of the present invention includes any and all such variations in administering effective amounts of the local anesthetic agents of the present invention as would be apparent to those skilled in the art and is not limited to the illustrative embodiments of the invention specifically described herein.

The practice of the present invention is further illustrated by reference to the following examples in which all "parts" and "percentages" are "parts and "percentages" by weight unless otherwise indicated.

Example I

A mixture of benzamidoethyl chloride (66 gm., 0.36 mole), 1,3-diisopropyl-2-thiourea (57 gm., 0.35 mole) and ethanol (300 ml.) was heated to boiling and refluxed for five hours. Upon dilution of the residue with ethyl acetate and cooling overnight at 75% yield (92 gm.) of crystalline 2 - (2′-benzamidoethylthio) - 1,3-diisopropyl-pseudourea hydrochloride, M.P. 181–3° C., was obtained.

Analysis.—Calc'd. for $C_{16}H_{25}N_3OS \cdot HCl$ (M.W. 343.93): C, 55.88%; H, 7.62%. Found: C, 56.20%; H, 7.51%.

Example II (a) A mixture of benzamidopropyl chloride (197.7 gm., 1 mole), 1-cyclohexyl-2-thiourea (158.3 gm., 1 mole) and isopropanol (600 ml.) was heated to boiling and refluxed for 6.5 hours. Concentration of the reaction mixture by distillation followed by dilution of the residue with acetone gave a yield of 325 gm. of crude 2-(3′-benzamidopropylthio)-1-cyclohexylpseudourea hydrochloride. After further purification by recrystallization from a methanol-ethyl acetate mixture a yield of 280 gm. of the compound with M.P. 161–2° C. was obtained.

Analysis.—Calc'd for $C_{17}H_{25}N_3OS \cdot HCl$ (M.W. 355.94): C, 57.36%; H, 7.36%; N, 11.81%; S, 9.01%; Cl, 9.96%. Found: C, 57.36%; H, 7.26%; N, 11.65%; S, 8.90%; Cl. 9.74%.

(b) The above hydrochloride salt of 2-(3′-benzamidopropyl-thio)-1-cyclohexylpseudourea was converted to the free base form of the compound by reaction with sodium carbonate as follows:

A solution of 2-(3′ - benzamidopropylthio) - 1-cyclohexylpseudourea hydrochloride (5 gm., 0.014 mole) in water (150 ml.) was cooled in an ice bath and stirred as a solution of sodium carbonate (1.48 gm., 0.014 mole) in water (25 ml.) was added dropwise. The free base precipitated as a white solid which was collected by filtration, washed with water, and dried in vacuo over potassium hydroxide; M.P. 103–5° C.; wt. 3.1 gm. A sample of the 2-(3′-benzamidopropylthio)-1-cyclohexyl-pseudourea was then dried in vacuo over potassium hydroxide at 65° C. for three hours and analyzed.

Analysis.—Cal'd for $C_{17}H_{25}N_3OS$: C, 63.91%; H, 7.88%. Found: C, 64.25%; H, 7.34%.

Example III

A mixture of o-chlorobenzamidoethyl chloride (11.0 gm., 0.05 mole), 1,3-diisopropyl-2-thiourea (8.0 gm., 0.05 mole) and ethanol (100 ml.) was heated to boiling and refluxed for five hours. The solvent was removed by distillation and the residue diluted with ethyl acetate. After two recrystallizations from ethanol-ethyl acetate a yield of 14.4 gm. of 2-[2′-(o-chlorobenzamido)-ethylthio] - 1,3 - diisopropylpseudourea hydrochloride, M.P. 134–6° C. was obtained.

Analysis.—Calc'd for $C_{16}H_{24}ClN_3OS \cdot HCl$ (M.W. 378.38); C, 50.79%; H, 6.66%. Found: C, 50.01%; H, 6.72%.

Example IV

A solution of benzamidoethyl chloride (12.9 gm., 0.07 mole) and 1-cyclohexyl-3-methyl-2-thiourea (12.05 gm., 0.07 mole), M.P. 162–4° C., in 150 ml. of ethanol was refluxed overnight, concentrated and then diluted with ethyl acetate to obtain a crystalline product. Upon recrystallization from ethanol-ethyl acetate a yield of 20.1 gm. (80% yield) of 2-(2′-benzamidoethylthio)-1-cyclohexyl-3-methyl-pseudourea hydrochloride, M.P. 176–8° C., was obtained.

Example V

A solution of benzamidoethyl chloride (9.2 gm., 0.05 mole) and 1,1-diallyl-2-thiourea (7.8 gm., 0.05 mole) in 50 ml. of ethanol was refluxed for eight hours, concentrated and cooled. The solid residue was recrystallized from methanol-ethyl acetate and a yield of 10.8 gm. (63% yield) of 2-(2′-benzamidoethylthio)-3,3-diallyl-pseudourea hydrochloride, M.P. 150–1° C., was obtained.

Employing the methods described in the above examples the following compounds were likewise prepared.

2-(2′-benzamidoethylthio)-1,3-diisopropylpseudourea hydrobromide (VI)

2-(2′-benzamidoethylthio)-1-cyclohexylpseudourea hydrochloride (VII)

2-(2′-benzamidoethylthio)-1-n-butylpseudourea hydrochloride (VIII)

2-(2′-benzamidoethylthio)-3,3-diethylpseudourea hydrochloride (IX)

2-(3′-benzamidopropylthio)-3,3-diethylpseudourea hydrochloride (X)

2-(2′-benzamidoethylthio)-1-methylpseudourea hydrochloride (XI)

2-(2′-benzamidoethylthio)-1,3-dimethylpseudourea hydrochloride (XII)

The compounds of Examples I to X were tested for local anesthetic activity on guinea pig cornea using a modified Chance and Lobstein [1] method and intradermally in guinea pig wheals using a modified Bulbring and Wajda [2] method. The lethal doses were measured by intravenous injection in white mice (i.v. $LD_{50}$). The activity and toxicity values presented here are relative values referring to lidocaine by hydrochloride as a standard, whose activity and toxicity are both by definition, unity. Thus, a compound is characterized by its relative anesthetic activity, RA, its relative toxicity, RT, and the ratio RA/RT, or anesthetic index, AI. These values are given in the table below.

As can be seen from the table, Compounds I to VIII are all more active topically (RA corneal 3.5, 3.5, 5.4, 5.1, 2.9, 2.3, 3.5, and 1.9, respectively) and intradermally (RA 2.8, 2.8, 2.0, 3.9, 1.1, 1.4, 3.1, and 1.7, respectively) than lidocaine (RA 1.0). On the other hand, Compounds I, III, IV and V are more toxic (RT 1.5, 1.7, 1.3, and 1.5, respectively) than lidocaine (RT 1.0), whereas Compounds II and VI are equivalent (RT 1.0) to lidocaine in toxicity. The anesthetic indices (RA/RT) of Compounds I–X topically (AI corneal 2.3, 3.5, 3.2, 3.9, 1.9, 2.3, 3.9, 2.1, 1.2, and 1.5, respectively) and Compounds I–IV and VI–X intradermally (AI 1.9, 2.8, 1.2, 3.0, 1.4, 3.4, 1.9, 1.3, and 1.3, respectively) are superior to those of lidocaine (AI 1.0). Consequently, all of Compounds I–X have a greater margin of safety than lidocaine with the exception of Compound V which is better than lidocaine when tested topically but not when tested intradermally. Compound V, however, is significantly and substantially more potent than lidocaine.

[1] Chance and Lobstein, J. Pharmacol. and Exper. Therap. 82, 203 (1944).
[2] Bulbring and Wajda, ibid. 85, 78 (1945).

TABLE

| Compound | EC₅₀¹ mg./ml. | | RA | | LD₅₀, mg./kg. I.V. | RT I.V. | AI=RA/RT | |
|---|---|---|---|---|---|---|---|---|
| | Corneal | I.D. | Corneal | I.D. | | | Corneal | I.D. |
| Lidocaine HCl | 9.2 | 0.74 | 1.0 | 1.0 | 32 | 1.0 | 1.0 | 1.0 |
| I | 2.6 | 0.26 | 3.5 | 2.8 | 21 | 1.5 | 2.3 | 1.9 |
| II | 2.6 | 0.26 | 3.5 | 2.8 | 31 | 1.0 | 3.5 | 2.8 |
| III | 1.7 | 0.37 | 5.4 | 2.0 | 19 | 1.7 | 3.2 | 1.2 |
| IV | 1/8 | 0.19 | 5.1 | 3.9 | 25 | 1.3 | 3.9 | 3.0 |
| V | 3.2 | 0.70 | 2.9 | 1.1 | 22 | 1.5 | 1.9 | 0.7 |
| VI | 4.9 | 0.52 | 2.3 | 1.4 | 33 | 1.0 | 2.3 | 1.4 |
| VII | 2.6 | 0.24 | 3.5 | 3.1 | 36 | 0.9 | 3.9 | 3.4 |
| VIII | 4.8 | 0.44 | 1.9 | 1.7 | 35 | 0.9 | 2.1 | 1.9 |
| IX | 13 | 0.91 | 0.71 | 0.8 | 51 | 0.6 | 1.2 | 1.3 |
| X | 10 | 0.98 | 0.92 | 0.8 | 50 | 0.6 | 1.5 | 1.3 |

¹ Effective concentration which anesthetized 50% of the test animals.

From the foregoing table it appears that the novel compounds of the present invention in which the sum of the carbon atoms in R, R₁ and R₂ is at least four more closely approach the ideal local anesthetic agent than any of the compounds previously known.

The compounds of Examples XI and XII were similarly tested for local anesthetic activity intradermally in guinea pig wheals as above and compared with the compound 2-2′-benzamidoethylthio)-pseudourea hydrochloride which has no alkyl groups bonded to any of the nitrogens in the thiopseudourea moiety. In this comparison it was found that Compounds XI and XII had margins of safety ($AI=RA/RT$) of 1.2 and 1.4, respectively, relative to the margin of safety of 1.0 of the compound 2-(2′-benzamidoethylthio)-pseudourea hydrochloride.

What is claimed is:

1. The method of inducing local anesthesia in animals which comprises administering to said animals an effective amount of a compound selected from the group consisting of benzamidoalkylthiopseudoureas having the formula:

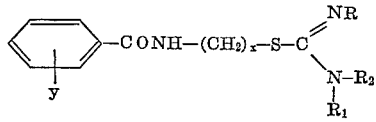

wherein $y$ is selected from the group consisting of —H, —Cl and —Br; $x$ is an integer of from 2 to 3; R, R₁ and R₂ are each selected from the group consisting of —H, —CH₂CH=CH₂, lower alkyl having from 1 to 4 carbon atoms and cyclohexyl and at least one of R, R₁ and R₂ are other than hydrogen; and the pharmaceutically acceptable acid salts thereof.

2. The method of claim 1 in which the benzamidoalkylthiopseudourea is 2-(2′-benzamidoethylthio)-1,3-diisopropylpseudourea hydrochloride.

3. The method of claim 1 in which the benzamidoalkylthiopseudourea is 2-(3′-benzamidopropylthio)-1-cyclohexylpseudourea hydrochloride.

4. The method of claim 1 in which the benzamidoalkylthiopseudourea is 2-(3′-benzamidopropylthio)-1-cyclohexylpseudourea.

5. The method of claim 1 in which the benzamidoalkylthiopseudourea is 2-[2′-(o-chlorobenzamido)-ethylthio]-1,3-diisopropylpseudourea hydrochloride.

6. The method of claim 1 in which the benzamidoalkylthiopseudourea is 2-(2′-benzamidoethylthio)-1-cyclohexyl-3-methylpseudourea hydrochloride.

7. The method of claim 1 in which the benzamidolkylthiopseudourea is 2-(2′-benzamidoethylthio)-3,3-diallylpseudourea hydrochloride.

8. The method of claim 1 in which the benzamidoalkylthiopseudourea is 2-(2′-benzamidoethylthio)-1,3-diisopropylpseudourea hydrobromide.

9. The method of claim 1 in which the benzamidoalkylthiopseudourea is 2-(2′-benzamidoethylthio-1-cyclohexylpseudourea hydrochloride.

10. The method of claim 1 in which the benzamidoalkylthiopseudourea is 2-(2′-benzamidoethylthio) - 1 - n-butylpseudourea hydrochloride.

11. The method of claim 1 in which the benzamidoalkylthiopseudourea is 2-(2′-benzamidoethylthio)-3,3-diethylpseudourea hydrochloride.

12. The method of claim 1 in which the benzamidoalkylthiopseudourea is 2-(3′-benzamidopropylthio)-3,3-diethylpseudourea hydrochloride.

13. The method of claim 1 in which the benzamidoalkylthiopseudourea is 2 - (2′ - benzamidoethylthio) - 1-methylpseudourea hydrochloride.

14. The method of claim 1 in which the benzamidoalkylthiopseudourea is 2-(2′-benzamidoethylthio)-1,3-dimethylpseudourea hydrochloride.

References Cited

Stirling: Journal Chemical Society (London), 1958, pp. 4524–30.

ALBERT T. MEYERS, *Primary Examiner.*

JEROME D. GOLDBERG, *Assistant Examiner.*